Jan. 3, 1956  W. R. ISOM  2,729,139
FILM PULL-DOWN CLAW
Filed May 28, 1952
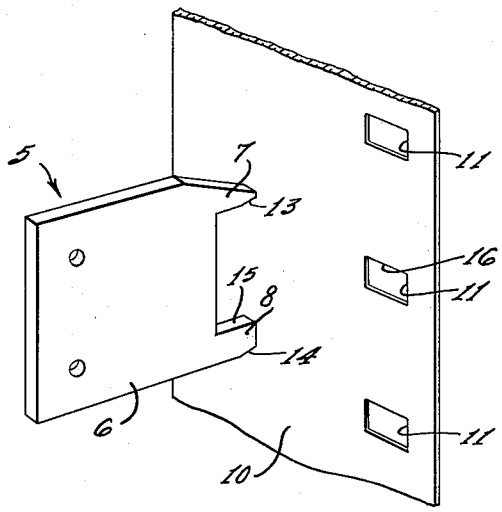
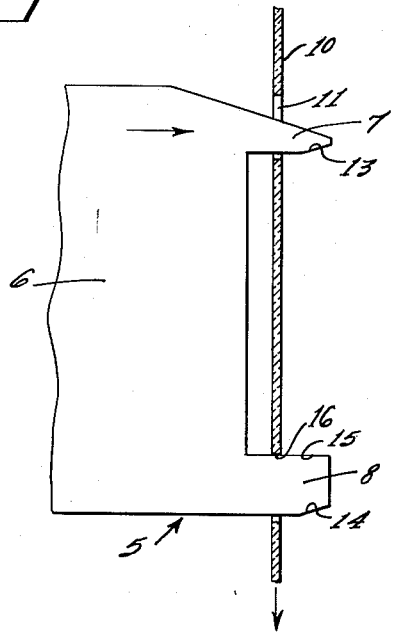
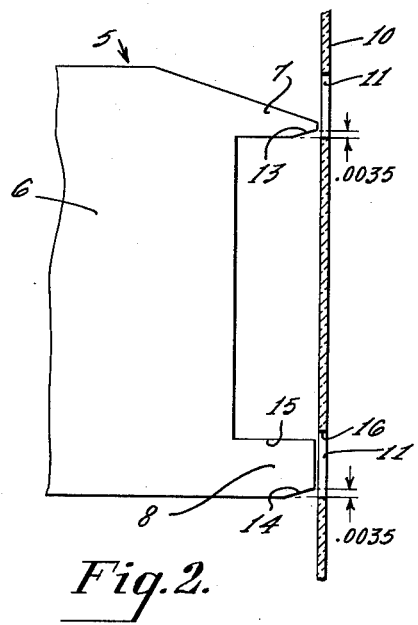
INVENTOR.
Warren R. Isom
BY
ATTORNEY.

United States Patent Office 2,729,139
Patented Jan. 3, 1956

2,729,139

FILM PULL-DOWN CLAW

Warren R. Isom, West Collingswood, N. J., assignor to Radio Corporation of America, a corporation of Delaware Application May 28, 1952, Serial No. 290,442

5 Claims. (Cl. 88—18.4)

This invention relates to motion picture film intermittent advancing mechanisms, and particularly to an element or unit of such mechanisms for use in cameras where the pull-down time is within the vertical blanking time of television, this time period being in the neighborhood of 1.336 milliseconds.

In my copending application, Ser. No. 285,209, filed April 30, 1952, now Patent No. 2,712,771, granted July 12, 1955, an intermittent film pull-down mechanism combining Geneva and cam-claw operations in series is disclosed and claimed. The present invention discloses and claims the specific type of claw used in such a rapid pull-down unit. This new claw permits low gate pressure which increases film life, prevents emulsion pile up, reduces the load or strain on the intermittent mechanism increasing its life, and reduces operation noise. Greater picture steadiness is obtained by using the parts of the sprocket holes least likely to be damaged.

In the past, claw type film advancing mechanisms depended upon the friction forces on the film passing through the gate to stop the film in the proper registration to receive an image or for projecting an image. Spring pressure was usually used for this purpose. In this manner of registration, the bottom of a sprocket hole and the bottom edge of the claw teeth were used. When the pull-down speed was increased, the tension on the film caused damage thereto and systems which released the gate pressure during pull-down and then reapplied it were tried. These were not satisfactory because of damaged sprocket holes, the damage to the film generally being the bottoms or leading edges of the holes which were used for registration.

The present invention solves the problem by using at least a two-toothed claw, at least one tooth of which is so shaped as to act as a registration pin. Although registration pins fit the sprocket holes very closely, the registration tooth of the present claw is constructed with consideration for film shrinkage. That is, the tooth cannot be larger than a shrunk sprocket hole.

If sixteen millimeter film is taken as an example, the intermittent advances the film the pitch of the sprocket holes or .300 inch twenty-four times per second. Since films of all degrees of shrinkage must be handled, the tooth has a dimension in the direction of the film motion to permit unshrunk film to slightly overshoot after the tooth has stopped. So, with film of one percent shrinkage, the tooth motion cannot be greater than .297 inch, which permits unshrunk film to overshoot .003 inch, the upper or trailing surface of the tooth and the upper or trailing edge of the sprocket hole doing the registering. Thus, the calculated tooth size is that of the sprocket hole (.050 inch) minus the frame shrinkage (.003 inch) minus the shrinkage in size of the sprocket hole (.0005 inch), making .0465 inch minus the tolerance of good workmanship.

There is another feature incorporated in the claw, namely, the bottom corners of each tooth have a radius or bevel sufficient to allow the claw to push the film down upon entering the sprocket hole during the starting of the intermittent or before it reaches the normal operating speed and before the film starts overshooting at the end of the stroke. The small amount of gate pressure permits the claw teeth to nudge down the film without damage during the starting period.

The principal object of the invention, therefore, is to facilitate the rapid intermittent advancement of film.

Another object of the invention is to provide an improved film pull-down claw for film.

A further object of the invention is to provide an improved tooth construction for a film pull-down claw which also provides film frame registration.

A still further object of the invention is to provide a claw tooth which functions to both pull down the film and register it when used with low gate pressure and progressive deceleration.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a perspective view of a claw embodying the invention.

Fig. 2 is an elevational side view of the claw of Fig. 1 in one position with respect to the film, and Fig. 3 is an elevational side view of the claw of Fig. 1 in another position with respect to the film.

Referring now to the drawings, in which the same numeral identifies the same element, a claw 5 has a body section 6 and two teeth 7 and 8. A film 10 of the sixteen millimeter type is shown with sprocket holes 11. As explained above, tooth 8 serves both for pulling the film into the gate intermittently and for registering the film in the gate. Tapered tooth 7 serves only to aid in pulling the film down, although it is to be understood that teeth 7 and 8 may be reversed or two teeth like tooth 8 may be used.

As shown in Fig. 2, the bottom or leading edges 13 and 14 of the teeth 7 and 8, respectively, are beveled or tapered, the difference between the tip and base height of tooth 8 being .0035 inch. The same taper is provided for tooth 7. The other dimensions of the claw and teeth are as given above, since the film 10 is standard sixteen millimeter film. For other width film having different sprocket hole spacing, the claw will be provided with proportionate dimensions. The tapered leading edges of the teeth permit the film to be advanced before the intermittent has reached a speed sufficient to produce overshooting. The top or trailing edge 15 of tooth 8 registers the film frame in the gate when the trailing edge 16 of the sprocket tooth hole or perforation comes in contact therewith, as shown in Fig. 3.

A claw having teeth of the above construction provides the many advantages mentioned above, and permits the rapid pull-down intermittent described in my above mentioned copending application to satisfactorily function.

I claim:

1. A film pull-down claw for both advancing and registering film in an aperture comprising a body portion and a plurality of teeth extending from said body portion and adapted to enter the sprocket holes of said film, be moved to advance said film, and be withdrawn from the sprocket holes of said film, at least one of said claws having a tapered tip and a height the height of the sprocket hole of unshrunk film minus the film shrinkage and the sprocket hole shrinkage, the lower sides of the tip portions of said teeth being beveled to provide said teeth with narrower tips than bases.

2. A film pull-down claw in accordance with claim 1, in which the lower sides of said teeth are parallel, the upper side of one of said teeth being parallel with the lower sides of said teeth to register said film in stopping position.

3. A film pull-down claw comprising a body portion and a pair of teeth extending therefrom, the leading edges of said teeth being at an angle to the surface of film to be moved by said teeth to move said film when said teeth are moved perpendicularly to the surface of said film, the remaining leading edges of said teeth being perpendicular to the surface of said film and advancing said film when said teeth are moved parallel with the surface of said film, one of said teeth having a height substantially the height of a sprocket hole in said film to register said film in stopping position when the trailing edge of a sprocket hole contacts the trailing edge of said tooth.

4. A film pull-down claw for advancing film into and out of an aperture comprising a body portion and a pair of teeth, one of said teeth having parallel sides at the base thereof and a height comparable to the height of the sprocket holes in the film to permit the trailing edge of said tooth to register a frame of said film in stopping position when the trailing edges of the sprocket holes contact said trailing edge of said tooth after the leading edges of said teeth have advanced said film into said aperture.

5. A film pull-down claw in accordance with claim 4, in which the leading edges of the base of said teeth are parallel, said teeth having narrower tips than bases.

References Cited in the file of this patent

UNITED STATES PATENTS 2,410,962     Contner                Nov. 12, 1946